United States Patent
Chen

(10) Patent No.: US 7,889,279 B2
(45) Date of Patent: Feb. 15, 2011

(54) METHOD AND APPARATUS FOR SUPPRESSING CROSS-COLORATION IN A VIDEO DISPLAY DEVICE

(75) Inventor: Mei-Fei Chen, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 1184 days.

(21) Appl. No.: 11/533,353

(22) Filed: Sep. 19, 2006

(65) Prior Publication Data

US 2007/0268410 A1 Nov. 22, 2007

(30) Foreign Application Priority Data

May 19, 2006 (TW) .............................. 95117795 A

(51) Int. Cl.
*H04N 5/21* (2006.01)
(52) U.S. Cl. ...................................... 348/631; 348/609
(58) Field of Classification Search ................ 348/609, 348/631, 702, 663, 701, 630; 386/22, 25; 345/589; 382/167, 261, 266
See application file for complete search history.

(56) References Cited

U.S. PATENT DOCUMENTS

| | | | |
|---|---|---|---|
| 2,975,290 A * | 3/1961 | Spitzer ................. 250/214 LS |
| 4,435,725 A * | 3/1984 | Nagao et al. ................ 348/663 |
| 4,847,683 A | 7/1989 | Lang |
| 5,150,203 A * | 9/1992 | Fairhurst .................... 348/631 |
| 5,355,176 A * | 10/1994 | Inagaki et al. .............. 348/609 |
| 5,526,060 A | 6/1996 | Raby |
| 5,805,238 A * | 9/1998 | Raby et al. ................. 348/609 |
| 6,108,048 A * | 8/2000 | Rinaldi ....................... 348/665 |
| 6,229,578 B1 | 5/2001 | Acharya |
| 2004/0032991 A1 | 2/2004 | Moon |
| 2006/0187357 A1* | 8/2006 | Satou et al. ................. 348/631 |

FOREIGN PATENT DOCUMENTS

| JP | P2000115798 A | 4/2000 |
|---|---|---|
| TW | 223214 | 5/1994 |
| TW | 378302 | 1/2000 |
| TW | 200529101 | 9/2005 |

* cited by examiner

*Primary Examiner*—Victor Kostak
(74) *Attorney, Agent, or Firm*—Winston Hsu; Scott Margo

(57) ABSTRACT

A method for suppressing cross-coloration in a video display device includes receiving high-frequency components of luminance signals corresponding to scanlines of an image frame, determining luminance transitions according to the high-frequency components of the luminance signals, and adjusting chrominance signals of the scanlines according to the luminance transitions.

36 Claims, 10 Drawing Sheets

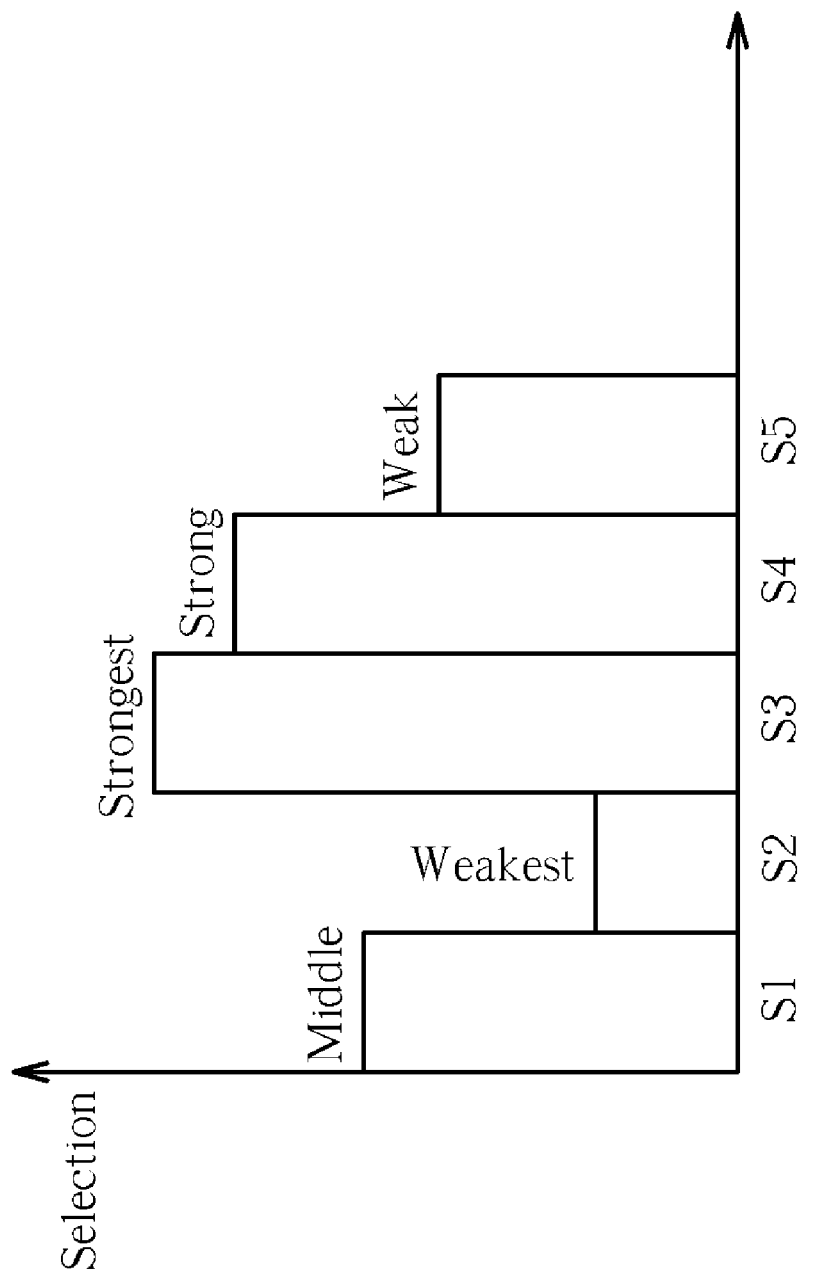

METHOD AND APPARATUS FOR SUPPRESSING CROSS-COLORATION IN A VIDEO DISPLAY DEVICE

BACKGROUND OF THE INVENTION

1. Field of the Invention

The present invention relates to methods and apparatuses for suppressing cross-coloration in video displays, and more particularly, the present invention teaches a method of adjusting a chrominance signal based on a luminance transition derived from high-frequency components of a luminance signal and a related apparatus.

2. Description of the Prior Art

With technological advances in display technology, video processing, and integrated circuit fabrication, in tandem with the rapid development of wireless networking, users can view their favorite movies and television programs on a video display device (such as a television) any time, any place. Thus, information and entertainment become increasingly accessible, and user requirements for picture quality increase in like manner.

The human eye has four different types of light receptor, of which three are used for distinguishing light of different wavelength (the fourth is only used under dim lighting conditions, and cannot discern colors). In other words, all light visible to the human eye can be fully described by three axes. Thus, when displaying a picture, only red, blue, and green (RGB) light information output is needed, when speaking in terms of the human eye, to show an image of realistic quality. However, to reduce bandwidth and ensure compatibility, the prior art color television broadcast system does not directly output RGB signals, but instead outputs a composite signal. The "composite" signal is an output signal that is a mix of a luminance signal and a chrominance signal, which is compatible with black-and-white and color television systems, and also conserves bandwidth.

The earliest television was the black-and-white television. Later, when color television systems were being developed, to promote compatibility between black-and-white television signals and color television signals, black-and-white (luminance) signals and color (chrominance) signals were separated. In this way, a black-and-white television needed only to decode the incoming luminance signal from a television station in order to display a picture. Color televisions would decode both the luminance signal and the chrominance signal together in order to display a color picture. Because the human eye is more sensitive to luminance than chrominance, or in other words, the human eye requires less color resolution than black-and-white resolution, the color signal does not require as much bandwidth as the black-and-white signal. Thus, by taking advantage of the human eye's relative insensitivity to color, transmission bandwidth can be reduced and used in black-and-white and color televisions.

Taking the National Television Standards Committee (NTSC) standard as an example, NTSC originally used a YIQ color space. The YIQ color space uses quadrature modulation to synthesize a common spectrum intermodulation signal I with a quadrature signal Q to form a single chrominance signal C. The chrominance signal C is then added to a luminance signal Y, and with an accompanying horizontal synchronization pulse, a blanking pulse, and a color burst, the composite signal is generated. The NTSC standard adopts a 6 MHz channel bandwidth, with 4.2 MHz reserved for the luminance signal Y, 1.6 MHz given to the intermodulation signal I, and 0.6 MHz appropriated to the quadrature signal Q. In contrast to the NTSC standard signal, the Phase Alternating Line (PAL) standard adopts a YUV color space. To increase picture quality, a color phase of the chrominance signal is alternately set as positive and negative for each successive scanline. The PAL standard uses an 8 MHz channel, allocating 5.5 MHz to the luminance signal Y and 1.8 MHz to a signal U and a signal V.

Thus, by splitting the luminance signal and the chrominance signal, then transmitting the signals together, the transmission bandwidth can be reduced, and the transmitted signal can be used in both black-and-white and color televisions. Correspondingly, a receiving end need only comprise a circuit such as a comb filter, for isolating the luminance signal Y and the chrominance signal C, in order to play both black-and-white and color television. However, the composite Y/C signal has one large problem, which primarily lies in the fact that high-frequency components of the luminance signal Y overlap with the frequency spectrum of the chrominance signal C. This makes it difficult for the receiving end to accurately and completely separate the luminance signal Y and the chrominance signal C in their original forms from the composite signal Y/C. Ultimately, this inability to separate the luminance signal Y from the chrominance signal C results in flaws in the picture. For example, if the luminance signal Y is processed as part of the chrominance signal C, a cross-color artifact is produced, and the picture will exhibit a rainbow effect. Likewise, if the chrominance signal C is processed as part of the luminance signal Y, a cross-luma artifact is produced, resulting in a horizontal or vertical dotted line in the picture.

In order to reduce the effects of the high-frequency components of the luminance signal Y occupying the same frequency spectrum as the chrominance signal C, U.S. Pat. No. 6,108,048 teaches a method of using a low pass filter to get a low-frequency portion of the luminance signal Y, and adjusting the chrominance signal C based on determination of a diagonal edge by detecting a luminance transition between scanlines of neighboring frames. In other words, the prior art uses the low-frequency portion of the luminance signal Y as a basis for finding the diagonal edge. However, because the low-frequency signal is more susceptible to low-frequency noise, the prior art often makes incorrect judgments, which means that the prior art is often unable to remove cross-coloration accurately. Further, when the incorrect judgment occurs, without a corresponding compensation mechanism, the picture quality is adversely affected.

SUMMARY OF THE INVENTION

Therefore, it is an objective of the present invention to provide a method and apparatus for reducing cross-coloration in a display device.

The present invention teaches a method used in a display device to suppress cross-coloration. First, a high-frequency portion of a luminance signal of a plurality of scanlines of an image frame is obtained. Based on the high-frequency components of the luminance signals of the plurality of scanlines, a level of luminance transition of the image frame is determined, and based on the luminance transition, a chrominance signal of the plurality of scanlines is adjusted.

The present invention further teaches an apparatus for suppressing cross-coloration in an image display device. The apparatus comprises a plurality of filters for obtaining high-frequency components of luminance signals of a plurality of scanlines in an image frame, an edge detector coupled to the plurality of filters for detecting a level of luminance transition in the image frame based on the high-frequency components of the luminance signals of the plurality of scanlines, and a compensator connected to the edge detector for adjusting a chrominance signal of the plurality of scanlines based on the level of luminance transition in the image frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 is a diagram of user settings for the controller of FIG. 9.

DETAILED DESCRIPTION

Figure 1:
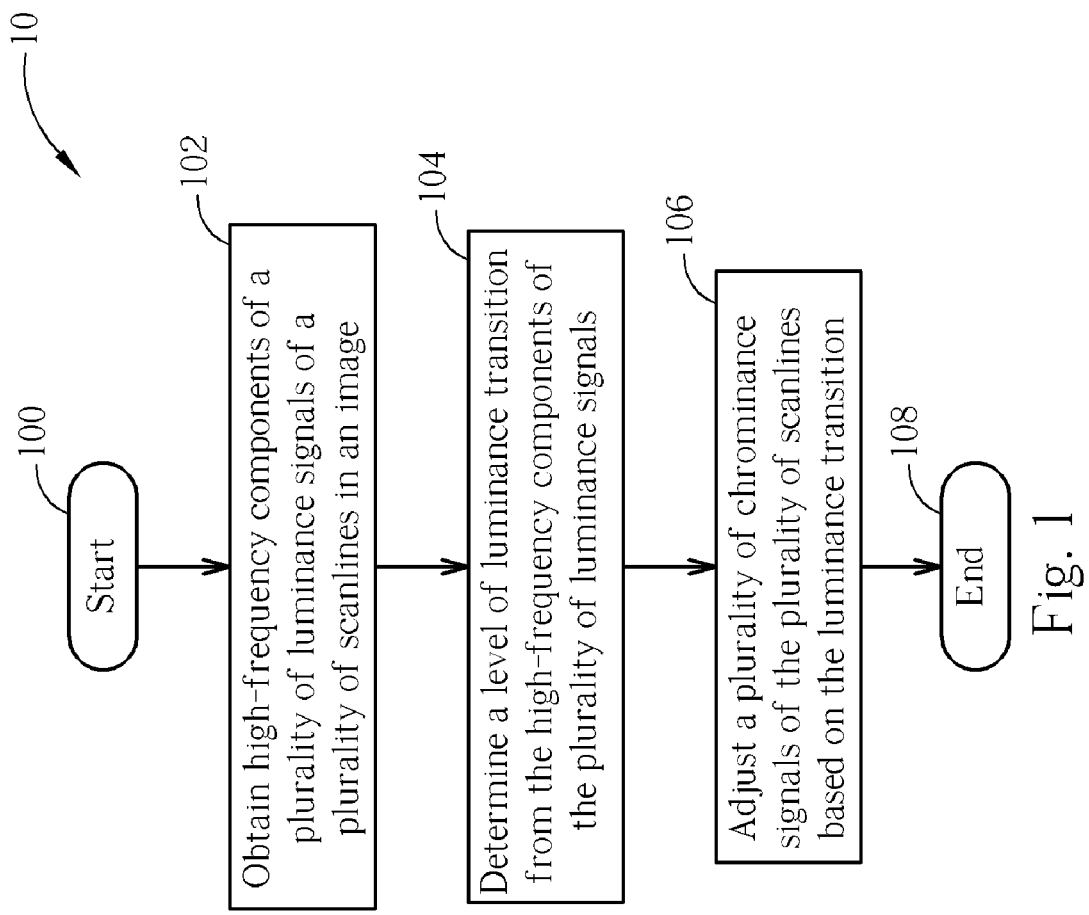
FIG. 1 is a flow chart of a cross-coloration suppression method used in an image display according to the present invention.

Please refer to FIG. 1, which is a flow chart of a preferred embodiment of a process 10 for suppressing cross-coloration in an image display device according to the present invention. The process 10 comprises steps of:

Step 100: Start.
Step 102: Obtain high-frequency components of a luminance signal of a plurality of scanlines in an image frame.
Step 104: Based on the high-frequency components of the luminance signal of the plurality of scanlines, determine a level of luminance transition in the image frame.
Step 106: Based on the level of luminance transition in the image frame, adjust a chrominance signal of the plurality of scanlines.
Step 108: End.

Thus, as can be seen from the process 10, the present invention determines the level of luminance transition in the image frame based on the high-frequency components of the luminance signal, and thereby adjusts the chrominance signal. It would be obvious to one familiar with the art that the high-frequency components of the luminance signal represent a difference in a value of neighboring luminance signals. In other words, the larger the difference in the high-frequency components of the neighboring luminance signals, the higher the level of difference between luminance signals of two neighboring scanlines of the image frame. Based on this difference, the level of luminance transition can be calculated and determined. In addition, because the high-frequency components of the luminance signal are in a common frequency band with the chrominance signal, when the value of the high-frequency components of the luminance signal are relatively large, the high-frequency components of the luminance signal may be considered as a part of the chrominance signal, inhibiting the image display from displaying an accurate chrominance signal. Thus, in the present invention, after obtaining the level of luminance transition, the chrominance signal can be adjusted in turn, thus suppressing cross-coloration.

In contrast, in the prior art, the low-frequency components of the luminance signal are used as a basis for calculations. The low-frequency components, however, are susceptible to noise and cause errors, and no compensator is provided. The present invention, on the other hand, uses the high-frequency components, thereby eliminating noise, and accurately adjusting the chrominance signal based on the luminance transition in the image frame.

Taking the NTSC standard as an example, in the present invention, when obtaining the high-frequency components of the luminance signal, because the chrominance signal is alternately positive and negative in successive scanlines, the sum of the high-frequency components of the composite signal of neighboring scanlines can be calculated to remove the chrominance signal components, leaving only the high-frequency components of the luminance signal. Based on the luminance signal, the level of luminance transition can be determined accurately. Additionally, under the PAL standard, a phase of each scanline is different from a phase of the scanline directly preceding it by 90 degrees. In other words, the phase shift of every two scanlines is 180 degrees (inverse polarity). Thus, by taking the sum of the high-frequency components of the composite signal in a scanline and another scanline two lines away, the chrominance signal component can be removed, leaving only the high-frequency components of the luminance signal. Based on the high-frequency components of the luminance signal, the level of luminance transition can be determined.

When adjusting the chrominance signal, the level of luminance transition of the image frame can correspond to a plurality of different thresholds, and a weighting can be applied to the adjustment of the chrominance signal of the scanlines based on the thresholds. For example, as the level of luminance transition increases, the chrominance signal adjustment weighting can be decreased. In addition, in order to avoid misjudgment, the present invention can further adjust the chrominance signal for each pixel. For example, weighted and adjusted chrominance signal information for a plurality of pixels in the same scanline as, and neighboring to, the pixel to be adjusted, could be obtained. Based on a preset formula, the pixel chrominance signal could be set to equal one chrominance signal of the plurality of chrominance signals. In this way, cross-coloration effects can be further reduced by targeting individual pixels for chrominance signal adjustment. In other words, the present invention is not limited to compensating for cross-coloration between neighboring scanlines, but can also further suppress cross-coloration between neighboring pixels in a scanline.

Figure 2:
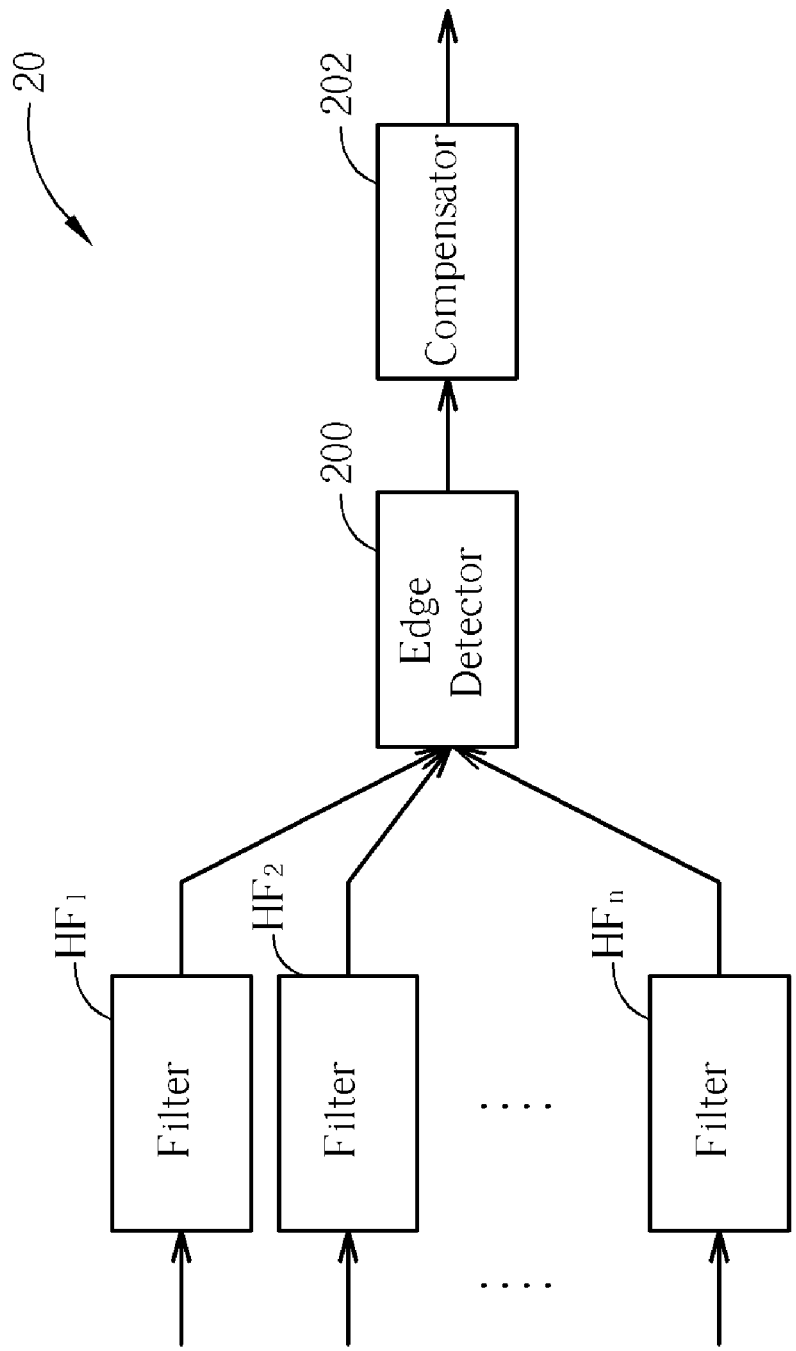
FIG. 2 is a diagram of a cross-coloration suppression device used in the image display according the present invention.

Please refer to FIG. 2, which is a block diagram of a cross-coloration suppression device 20 used in an image display device according to the present invention. The cross-coloration suppression device 20 is used to realize the process 10 described above. The cross-coloration suppression device 20 comprises a plurality of filters $HF_1$-$HF_n$, an edge detector 200, and a compensator 202. The plurality of filters $HF_1$-$HF_n$ individually correspond to a plurality of scanlines in an image for display, and are used to obtain high-frequency components of a composite signal of the plurality of scanlines. The edge detector 200 is used to obtain a level of luminance transition in the image frame based on a filtered result from the plurality of filters $HF_1$-$HF_n$. The compensator 202 is used to adjust a chrominance signal of the plurality of scanlines based on a result from the edge detector 200. Thus, the cross-coloration suppression device 20 obtains the high-frequency components of the luminance signal from the plurality of filters $HF_1$-$HF_n$, finds the level of luminance transition in the image frame through the edge detector 200, and adjusts the chrominance signal through the compensator 202.

As described above, the high-frequency components of the luminance signal represent a difference in value between neighboring luminance signals. A larger difference in value represents a greater difference in luminance signal between neighboring scanlines. Because the high-frequency components of the luminance signal occupy the same frequency band as the chrominance signal, the high-frequency components of the luminance signal may contribute to the chrominance signal, making it impossible for the display device to obtain an accurate chrominance signal. Thus, in the cross-coloration suppression device 20, the edge detector 200 measures the level of luminance transition, and the compensator 202 adjusts the chrominance signal accordingly, thereby suppressing cross-coloration, and improving image display quality.

When realizing the plurality of filters $HF_1$-$HF_n$, a plurality of bandpass filters can be used to obtain signals within the frequency band occupied by the high-frequency components of the luminance signal and the chrominance signal, and select an appropriate output from the plurality of filters $HF_1$-$HF_n$, before adding the outputs of the plurality of filters at the edge detector 200, in order to improve accuracy and simultaneously remove the chrominance signal, which is alternately positive and negative in successive scanlines. In addition, a combination of a bandstop filter and an adder could be used to retrieve the shared frequency band of the high-frequency components of the luminance signal and the chrominance signal in the composite signal. Please refer to FIG. 3, which is a block diagram of a filter 30. The filter 30 is used to realize the plurality of filters $HF_1$-$HF_n$ shown in FIG. 2. The filter 30 comprises a notch filter 300 and an adder 302. Please refer to FIG. 4, which is a plot of a frequency response of the notch filter 300. The response of the notch filter 300 between a first frequency $F_{n1}$ and a second frequency $F_{n2}$ is cutoff. Thus, by choosing the first frequency $F_{n1}$ and the second frequency $F_{n2}$ appropriately, and subtracting an output of the notch filter 300 from an input of the notch filter 300 at the adder 302, the shared frequency band of the high-frequency components of the luminance signal and the chrominance signal can be obtained from the composite signal. Of course, the notch filter 300 could be any analog or digital filter that meets the required frequency response shown in FIG. 4.

Figure 5:
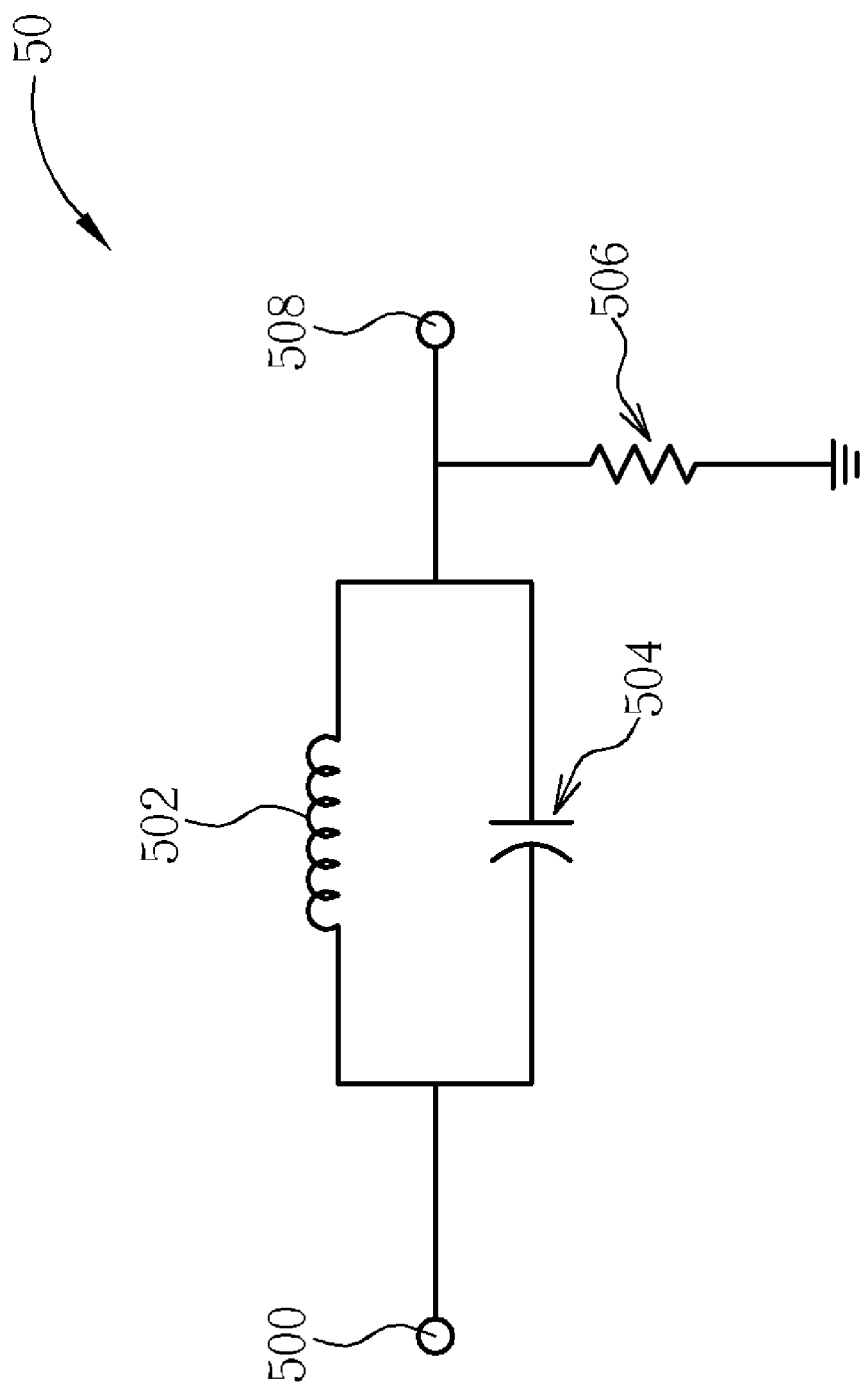
FIG. 5 is a diagram of an analog bandstop filter.

For example, please refer to FIG. 5, which is a diagram of an analog realization of a bandstop filter 50. The bandstop filter 50 receives the composite signal through an input end 500, filters the composite signal through an inductor 502, a capacitor 504, and a resistor 506 connected as shown, and outputs the filtered composite signal through an output end 508. The analog bandstop filter 50 has an advantage of simplicity, however a disadvantage of the analog bandstop filter 50 is that it is susceptible to changes in environmental factors such as temperature and humidity, which can alter a frequency response of the filter. Further, in an integrated circuit (IC), the analog filter requires a large layout area. Thus, a preferable embodiment of the notch filter 300 described above is a digital bandstop filter or another integrated filter circuit with similar characteristics.

Figure 3:
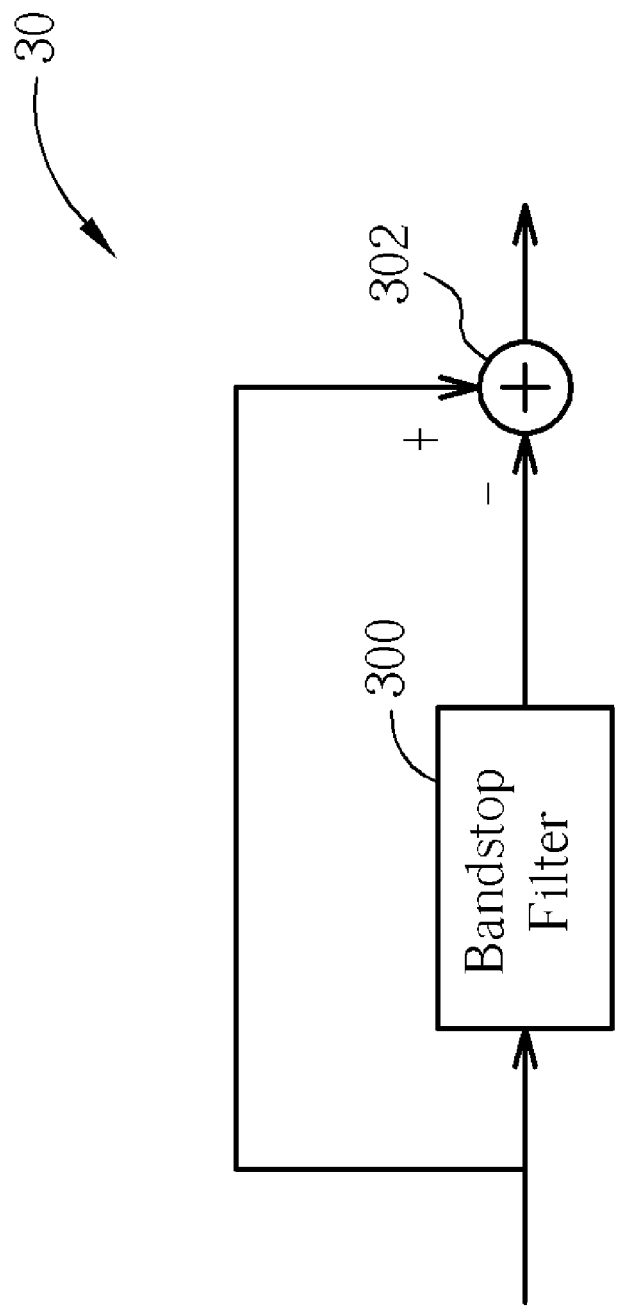
FIG. 3 is a diagram of a filter.
Figure 4:
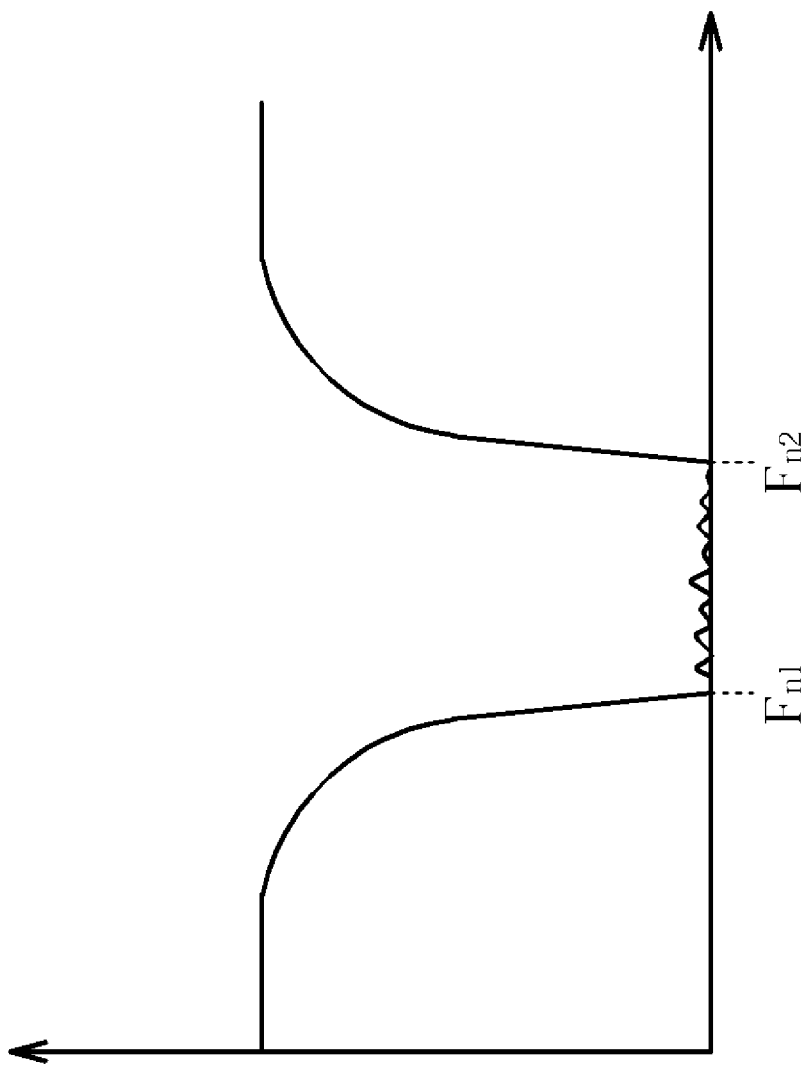
FIG. 4 is a frequency response diagram of a bandstop filter.
Figure 6:
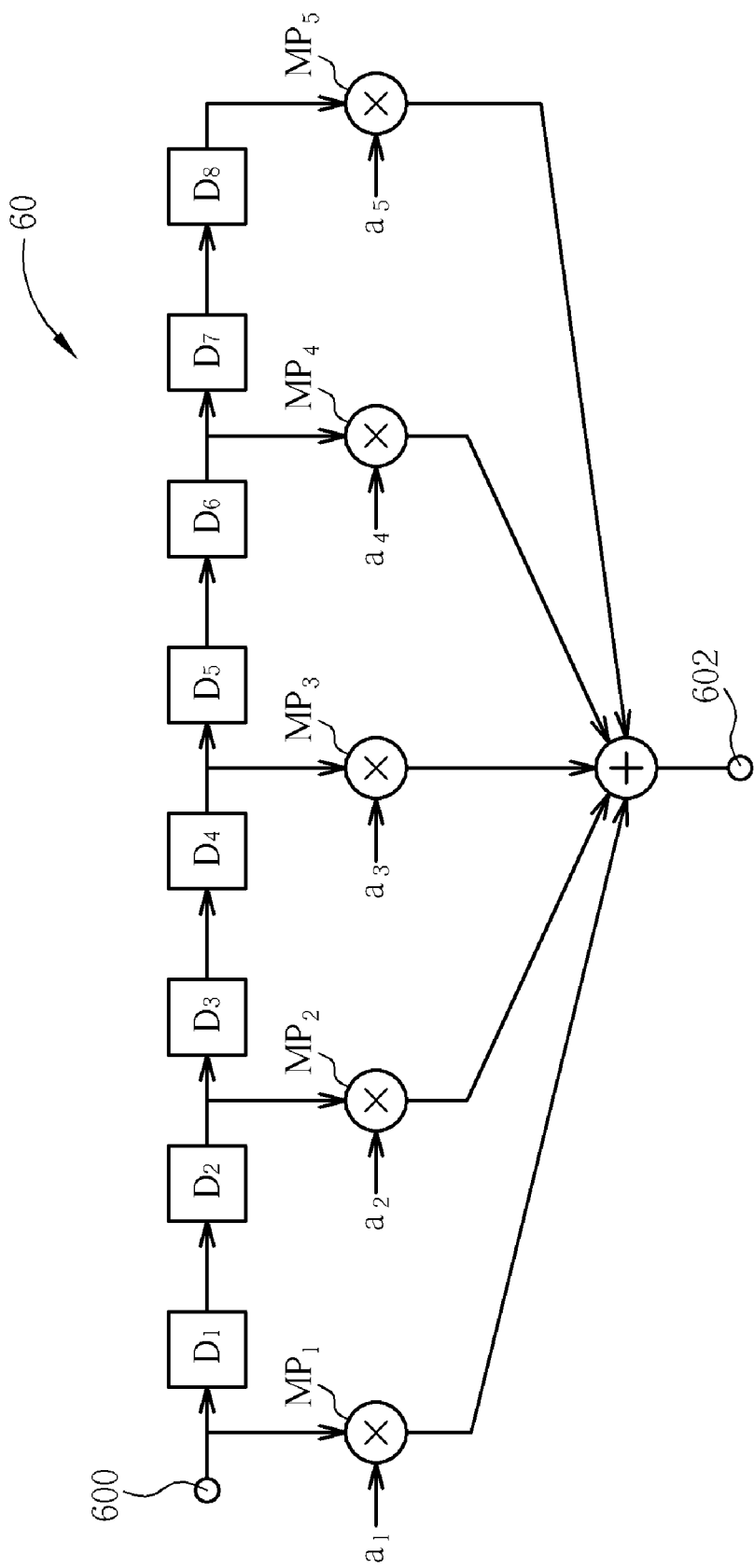
FIG. 6 is a diagram of a digital bandstop filter.

Taking a chrominance signal formed of two color-difference signals Cr, Cb as an example, please refer to FIG. 6, which shows a digital bandstop filter 60. The digital bandstop filter 60 processes a binary digital signal to overcome the disadvantages of the analog bandstop filter 50 described above. The digital bandstop filter 60 comprises a receiver end 600 for receiving a digital output signal from an analog-to-digital converter (not shown in FIG. 6). The digital bandstop filter 60 uses a logic block comprising a plurality of delay registers $D_1$-$D_8$, a plurality of multipliers $MP_1$-$MP_5$, and an adder, to filter the digital signal, then outputs the filtered digital signal through an output end 602. A plurality of multiplicators $a_1$-$a_5$ of the multipliers $MP_1$-$MP_5$ are used to set the required frequency band stopped by the bandstop filter 60. Please note that the analog bandstop filter 50 of FIG. 5 and the digital bandstop filter 60 of FIG. 6 are used as a reference only to realize the notch filter 300 of FIG. 3, and are not limiting upon the scope of the present invention apparatus. Likewise, the filter of FIG. 3 is an example of how to realize the plurality of filters $HF_1$-$HF_n$ of FIG. 2, which are used to obtain the shared frequency band of the high-frequency components of the luminance signal and the chrominance signal, and is also not limiting upon the scope of the present invention apparatus.

In the cross-coloration suppression device 20, after the filters $HF_1$-$HF_2$ obtain the shared frequency band of the high-frequency components of the luminance signal and the chrominance signal, the edge detector 200 further determines the level of luminance transition. As described above, the high-frequency components of the luminance signal represent the difference in the value of the neighboring luminance signals. The larger the difference between the values, the larger the level of luminance transition between the luminance signals of the neighboring scanlines. Thus, for the NTSC standard, the edge detector 200 can use the sum of the high-frequency components of the composite signal of neighboring scanlines to determine the level of luminance transition in the image frame, thereby increasing accuracy and simultaneously removing the chrominance signal components, as the chrominance signal is alternately positive and negative in successive scanlines. Or, for the PAL standard, the edge detector 200 can use the sum of the high-frequency components of the composite signal in two scanlines separated by a third scanline to determine the level of luminance transition in the image frame, thereby increasing accuracy and simultaneously removing the chrominance signal components.

Figure 7:
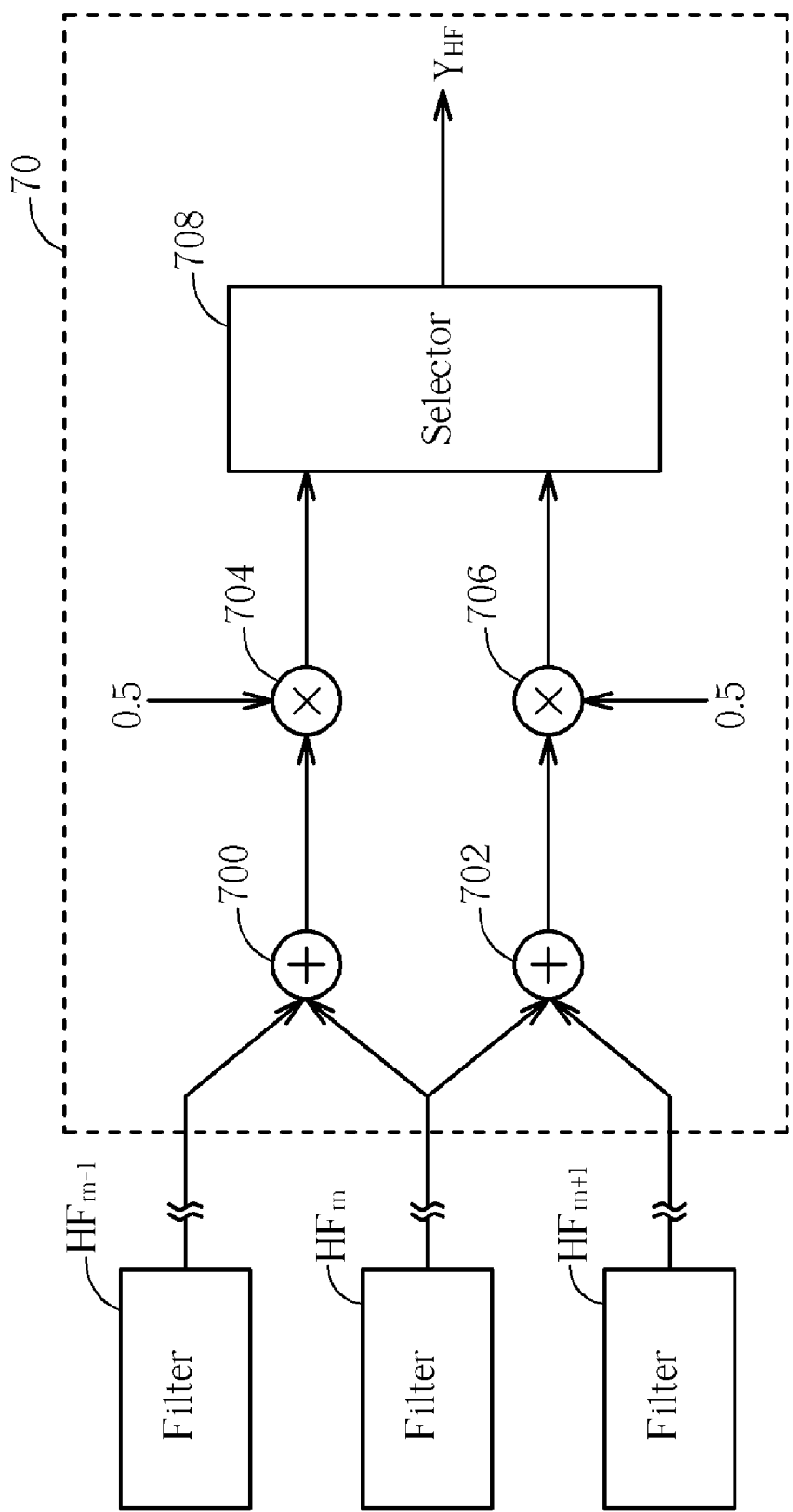
FIG. 7 is a diagram of an edge detector.

Please refer to FIG. 7. FIG. 7 is a block diagram of an edge detector 70. For the sake of brevity, only part of the edge detector 70 is shown. The edge detector 70 can be used as the edge detector 200 shown for the NTSC standard. The edge detector 70 comprises a first adder 700, a second adder 702, a first multiplier 704, a second multiplier 706, and a multiplexer 708. The adders 700,702 are used to add outputs from neighboring filters $HF_{m-1}$, $HF_m$, $HF_{m+1}$, in order to remove the chrominance signal, which is alternately positive and negative in successive scanlines. After removing the chrominance signal, the multipliers 704,706 multiply the result from the adders by 0.5. Finally, the multiplexer 708 can choose one of the output signals $Y_{HF}$ from the multipliers 704,706 to output to the compensator 202 based on a criterion, such whichever is largest. When the multiplexer 708 is selecting one of the results from the multipliers 704,706, a number of different criteria can be set, such as selecting the largest, the smallest, or a preset value. In other words, because the high-frequency components of the luminance signal represent the difference in the value of the neighboring luminance signals, after the filters $HF_{m-1}$, $HF_m$, $HF_{m+1}$ output the shared frequency band of the high-frequency components of the luminance signal and the chrominance signal in the composite signal, the adders 700,702 can sum the high-frequency components of the luminance signals of the neighboring scanlines, and remove the chrominance signal component. The multiplexer 708 then selects the multiplier output signal $Y_{HF}$ to send to the compensator 202 as a reference for adjusting the chrominance signal. It is worthy of note that the edge detector 70 used to add the output signals of the neighboring filters $HF_{m-1}$, $HF_m$, $HF_{m+1}$, so as to remove the chrominance signal from the NTSC standard composite signal, is only one possible embodiment, and is not limiting upon the present invention. Of course, anyone with ordinary skill in the art would also be able to adapt the present invention method to any television transmission standard without leaving the scope of the present invention. For example, for the PAL standard composite signal, the edge detector 70 could add the outputs of every other filter $HF_{m-2}$, $HF_m$, $HF_{m+2}$, so as to remove the chrominance signal from the PAL composite signal.

Figure 8:
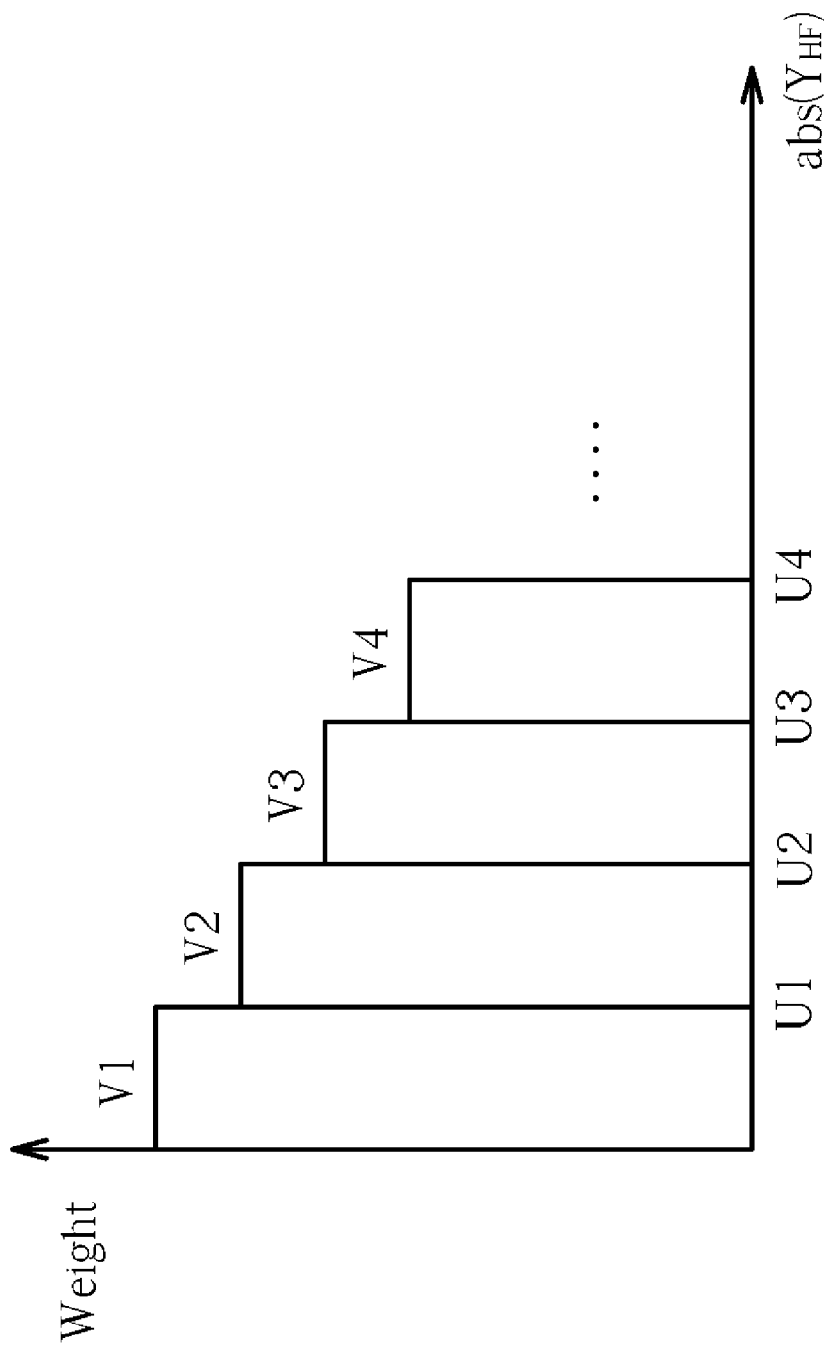
FIG. 8 is a diagram of a compensator.

Regarding the operation of the compensator 202, the present invention could assign one of a plurality of weights to the adjustment of each chrominance signal based on a plurality of thresholds corresponding to the levels of luminance transition in the image. Please refer to FIG. 8, which is a diagram of the operation of the compensator 202. In FIG. 8, points U1-U4 (U5-Un not shown) on the horizontal axis represent the plurality of increasing thresholds based on an absolute value of the output $Y_{HF}$ of the multiplexer 708. The vertical axis represents the plurality of weights for adjusting the chrominance signal corresponding to the plurality of thresholds U1-U4. When the absolute value of the output $Y_{HF}$ of the multiplexer 708 is less than U1, the chrominance signal is multiplied by a factor V1. When the absolute value of the output $Y_{HF}$ is between the threshold U1 and the threshold U2, the chrominance signal is multiplied by a factor V2. Hence, as the level of luminance transition in the image increases, the weighting for adjustment of the chrominance signal decreases. In this way, cross-coloration can be suppressed, improving image quality.

Thus, in the cross-coloration suppression device 20, the shared frequency band of the high-frequency components of the luminance signal and the chrominance signal is obtained through the filters $HF_1$-$HF_n$, then the level of luminance transition is determined by the edge detector 200, and, finally, the level of luminance transition is compared against the plurality of thresholds in the compensator 202, which adjusts the chrominance signal in the different scanlines based on the weights corresponding to the thresholds, thereby suppressing the effect of cross-coloration, and improving the image quality. Herein, a comb filter (not shown in FIG. 2) or other such device could be used to obtain the chrominance signal, however further examples are omitted as the type of filter is not an emphasis of the present invention, and would be obvious to one of ordinary skill in the art.

Figure 9:
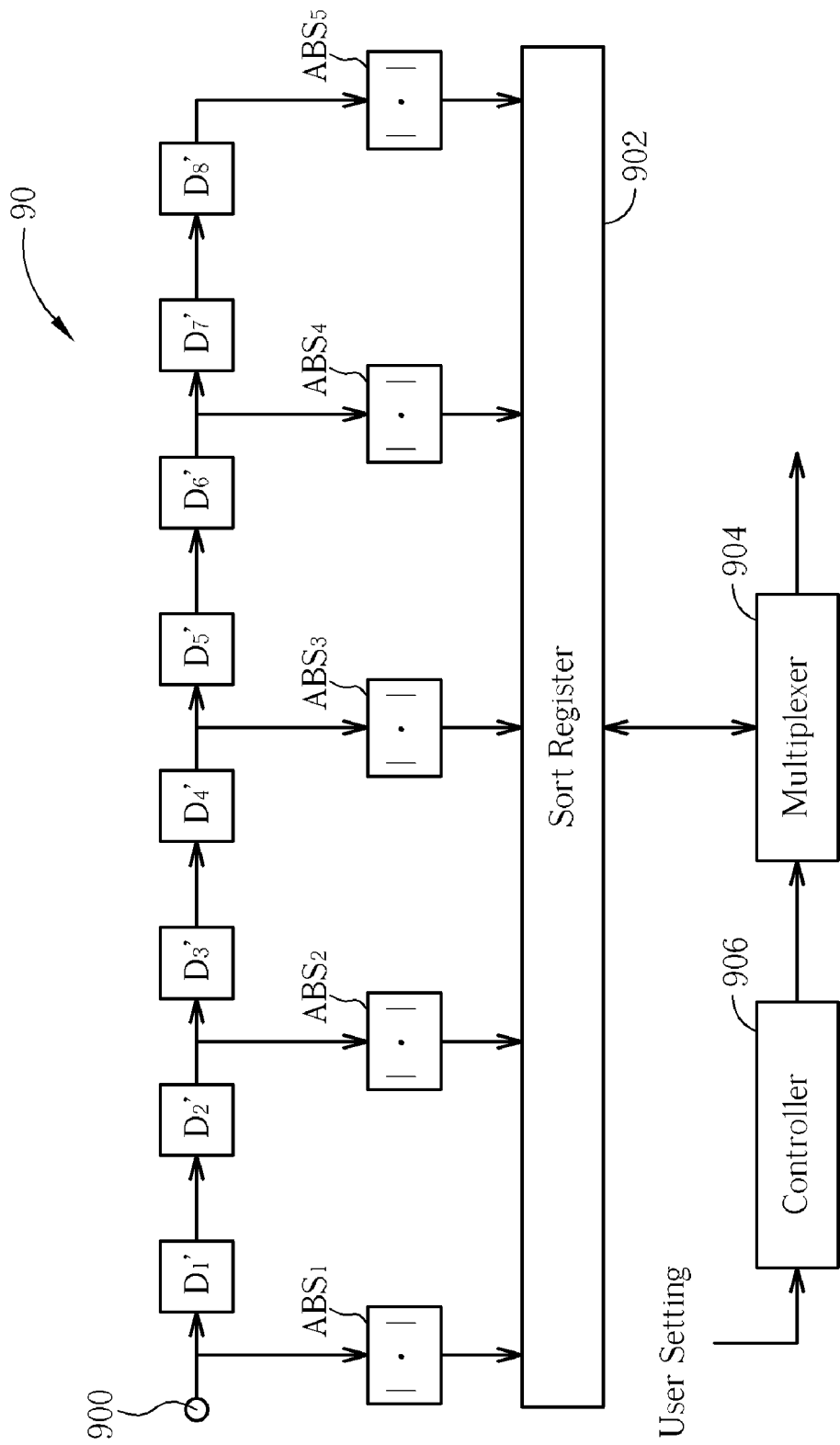
FIG. 9 is a diagram of an enhanced compensator.

Thus, the cross-coloration suppression device 20 accurately suppresses cross-coloration and improves image quality by adjusting the chrominance signal based on the level of luminance transition, which is determined from the high-frequency components of the luminance signal. In addition, the present invention can also be used to adjust the chrominance signal of each of a plurality of pixels. For an example of a condition wherein the chrominance signal comprises two color-difference signals Cr, Cb, please refer to FIG. 9, which is a diagram of an enhanced compensator 90 used in the present invention. The enhanced compensator 90 can replace the compensator 202 described above, or, preferably, can be used as an output end for the compensator 202. Based on the compensation factor of the compensator 202, the enhanced compensator 90 can adjust the chrominance signal of each of the plurality of pixels, so as to avoid error. The enhanced compensator 90 receives the output of the compensator 202 through an input end 900, then outputs an enhanced compensation factor through a plurality of delay registers $D_1'$-$D_8'$, a plurality of absolute value calculators $ABS_1$-$ABS_5$, a sort register 902, a multiplexer 904, and a controller 906. The multiplexer 904 outputs the enhanced compensation factor. When adjusting the chrominance of a pixel, the enhanced compensator 90 obtains the chrominance of two previous pixels and two following pixels in the same scanline from the output of the compensator 202. An absolute value of the output is obtained through the absolute value calculators $ABS_1$-$ABS_5$, and sorted by the sort register 902. Finally, the controller 906 controls the multiplexer 904 based on a user setting, thereby obtaining a specific chrominance from the output of the sort register 902. In other words, the enhanced compensator 90 selects the chrominance for use as the chrominance of the pixel from the chrominance of the preceding pixels and the following pixels. Of course, the chrominance can be selected from more than just two neighboring pixels. Further, the chrominance can be selected from the pixel itself. The pixel itself can be considered one of the plurality of neighboring pixels for selecting the chrominance for the pixel. In summary, the compensator 202 adjusts the chrominance of neighboring scanlines, and the enhanced compensator 90 adjusts the chrominance of neighboring pixels in one scanline.

In addition, the user settings can be adjusted based on the needs of the user. Please refer to FIG. 10, which is a diagram of the user settings received by the controller 906 of FIG. 9. FIG. 10 shows five settings S1-S5. If the absolute value of the output $Y_{HF}$ falls within the setting S3, the multiplexer 902 chooses the highest value in the sort register 902 as the corresponding chrominance. If the output $Y_{HF}$ falls within the setting S2, then the multiplexer 902 will choose the lowest value in the sort register 902 as the corresponding chrominance. Thus, the enhanced compensator 90 sorts the chrominance signals of two preceding pixels and two following pixels, then selects one of the chrominance signals based on the setting of the controller 906. Again, please realize that the diagram of FIG. 10 is only one example of a setting scheme for the controller, and could be altered in various forms while maintaining the spirit of the present invention.

To summarize, the present invention adjusts a chrominance of a scanline or pixel based on a level of luminance transition determined from high-frequency components of a luminance signal. To extract high-frequency components of a luminance signal, high-frequency components of the composite signals in two neighboring scanlines are summed to remove the chrominance component. When adjusting the chrominance signal, the level of luminance transition is compared against a plurality of thresholds in order to give a weight to the adjustment factor applied to the chrominance signal of the scanline. Further, to improve adjustment accuracy in a single scanline, the chrominance of each of a plurality of pixels in the scanline can be adjusted. The adjustment is accomplished by choosing one chrominance of a plurality of neighboring pixels as the chrominance of the pixel being adjusted. Thus, the present invention not only adjusts the chrominance in scanlines, but also adjusts the chrominance of the individual pixels within each scanline. In contrast with the prior art, the present invention accomplishes the above through use of the high-frequency components of the luminance signal, as opposed to the low-frequency components of the luminance signal used in the prior art, which are susceptible to low-frequency noise. Further, the present invention incorporates compensation, which is not found in the prior art. These differences allow the present invention to adjust the chrominance more accurately, thus improving image quality and overcoming the shortcomings of the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for cross-coloration suppression in an image display, the method comprising:
    obtaining a plurality of high-frequency components of a plurality of luminance signals corresponding to a plurality of scanlines in an image;
    determining a luminance transition based on summing a plurality of high-frequency components of a composite signal of n scanlines of the plurality of scanlines; and
    adjusting a plurality of chrominance signals corresponding to the plurality of scanlines based on the luminance transition.

2. The method of claim 1, wherein n is greater than 1.

3. The method of claim 1, wherein adjusting the plurality of chrominance signals corresponding to the plurality of scanlines based on the luminance transition is corresponding the level of luminance transition to a plurality of thresholds, and changing the adjustment weight utilized to adjust the plurality of chrominance signals corresponding to the plurality of scanlines according to the plurality of thresholds.

4. The method of claim 1, wherein the step of adjusting the plurality of chrominance signals corresponding to the plurality of scanlines based on the luminance transition is decreasing the plurality of chrominance signals corresponding to the plurality of scanlines based on the luminance transition.

5. The method of claim 1 further comprising adjusting a chrominance of a plurality of pixels in the scanline.

6. The method of claim 1 further comprising obtaining a plurality of chrominance signals corresponding to a plurality of neighboring pixels in the same scanline, wherein one of the plurality of chrominance signals is chosen based on a preset criterion to set a chrominance of a neighboring pixel.

7. The method of claim 1, wherein the image conforms to a National Television System Committee (NTSC) standard.

8. The method of claim 1, wherein the image conforms to a Phase Alternating (PAL) standard.

9. The method of claim 1 further comprising displaying the image based on the plurality of luminance signals and the plurality of adjusted chrominance signals of the plurality of scanlines.

10. A cross-coloration suppression device used in an image display comprising:
    a plurality of filters for obtaining a plurality of high-frequency components of a plurality of composite signals of a plurality of scanlines in an image;
    an edge detector connected to the plurality of filters for determining a level of a luminance transition based on a plurality of high-frequency components of a plurality of luminance signals in the plurality of scanlines; and
    a compensator connected to the edge detector for adjusting a plurality of chrominance signals of the plurality of scanlines based on the level of luminance transition.

11. The cross-coloration suppression device of claim 10, wherein each of the plurality of filters is a bandstop filter.

12. The cross-coloration suppression device of claim 10, wherein each of the plurality of filters comprises:
    a notch filter; and
    an adder connected to an input of the notch filter and to an output of the notch filter for calculating a signal difference between the input of the notch filter and the output of the notch filter.

13. The cross-coloration suppression device of claim 12, wherein the notch filter comprises:
    an input for receiving a signal;
    an inductor comprising a first terminal connected to the input and a second terminal;
    a capacitor comprising a first terminal connected to the input and a second terminal;
    a resistor comprising a first terminal connected to the second terminal of the inductor and the second terminal of the capacitor, and a second terminal; and
    an output connected to the first terminal of the resistor.

14. The cross-coloration suppression device of claim 12 further comprising an analog-to-digital converter (ADC) connected to the notch filter for converting an analog signal to a digital signal, the notch filter comprising:
    a delay register array connected to the ADC, the array comprising a plurality of delay registers connected in series;
    a plurality of multipliers, each multiplier comprising a first terminal for receiving an output signal from one delay register of the delay register array, a second terminal for receiving a multiplication factor, and an output terminal for outputting a multiplication result of the output signal from the delay register and the multiplication factor; and
    an adder connected to the output terminal of each of the plurality of multipliers for outputting a calculated result of the notch filter.

15. The cross-coloration suppression device of claim 14, wherein a specific number of the delay registers separates each of the plurality of multipliers.

16. The cross-coloration suppression device of claim 15, wherein the specific number is equal to a number of signals comprised by each of the plurality of chrominance signals.

17. The cross-coloration suppression device of claim 14, wherein the multiplication factor is set based on a required cutoff frequency.

18. The cross-coloration suppression device of claim 10, wherein the edge detector is used to determine a level of luminance transition based on a sum of the high-frequency components of the composite signal of every n scanlines of the plurality of scanlines.

19. The cross-coloration suppression device of claim 18, wherein n is greater than 1.

20. The cross-coloration suppression device of claim 16, wherein the edge detector comprises:
    a plurality of adders connected to the plurality of filters for calculating a sum of a plurality of output signals corresponding to the plurality of filters; and
    a selector connected to the plurality of adders for selecting one output from the plurality of adders to determine the level of luminance transition.

21. The cross-coloration suppression device of claim 20, wherein the selector chooses an output of the plurality of adders with a largest value to determine the level of luminance transition.

22. The cross-coloration suppression device of claim 20, wherein the edge detector further comprises a plurality of multipliers connected to between the plurality of adders and the selector for multiplying the output of the plurality of adders with a multiplication factor.

23. The cross-coloration suppression device of claim 10, wherein the compensator corresponds the level of luminance transition to a plurality of thresholds and changes an adjustment weight of the plurality of chrominance signals of the plurality of scanlines based on the plurality of thresholds.

24. The cross-coloration suppression device of claim 10, wherein the compensator reduces the plurality of chrominance signals of the plurality of scanlines based on the level of the luminance transition of the image.

25. The cross-coloration suppression device of claim 10 further comprising a first enhanced compensator for adjusting a chrominance of a pixel in the plurality of scanlines.

26. The cross-coloration suppression device of claim 10 further comprising a second enhanced compensator for obtaining a plurality of chrominance signals of a plurality of neighboring pixels that neighbor a pixel in the same scanline, and setting the chrominance of the pixel to the chrominance of one of the plurality of neighboring pixels based on a preset rule.

27. The cross-coloration suppression device of claim 26, wherein the second enhanced compensator comprises:
- an input for receiving the chrominance of the pixel and the plurality of chrominance signals of the neighboring pixels;
- an array of delay registers connected to the input, the array comprising a plurality of delay registers connected in a series;
- a plurality of absolute value calculators, each absolute value calculator comprising an input terminal connected to one delay register, and an output terminal for outputting an absolute value of an output of the delay register;
- a sort register connected to the output terminal of each of the plurality of absolute value calculators for sorting the plurality of absolute values outputted by the plurality of absolute value calculators; and
- a multiplexer connected to the sort register for outputting a sort result of the sort register based on an enhanced compensator rule to be the chrominance of the pixel.

28. The cross-coloration suppression device of claim 27, wherein the second enhanced compensator further comprises a controller for deciding the enhanced compensator rule based on a user setting.

29. The cross-coloration suppression device of claim 27, wherein the pixel and the plurality of neighboring pixels are located in a same scanline.

30. The cross-coloration suppression device of claim 27, wherein the input of the second enhanced compensator is connected to the output terminal of the compensator.

31. The cross-coloration suppression device of claim 27, wherein each of the plurality of absolute value calculators is separated by a specific number of delay registers.

32. The cross-coloration suppression device of claim 31, wherein the specific number is equal to a number of signals comprised by the chrominance signal.

33. The cross-coloration suppression device of claim 27, wherein the multiplexer is used to select the sort result of the sort register as information of the chrominance signal of the pixel based on the enhanced compensator rule and a result of the compensator.

34. The cross-coloration suppression device of claim 10, wherein the image conforms to a National Television System Committee standard.

35. The cross-coloration suppression device of claim 10, wherein the image conforms to a Phase Alternating Line standard.

36. The cross-coloration suppression device of claim 10 further comprising an image output for displaying the image based on the plurality of luminance signals and the plurality of adjusted chrominance signals of the plurality of scanlines.

* * * * *